March 15, 1966 W. G. WALTERMIRE 3,240,248
LOCK NUT
Filed Jan. 21, 1963

INVENTOR.
WILLIAM G. WALTERMIRE
BY Williams, David,
Hoffmann & Yount
ATTORNEYS

United States Patent Office 3,240,248
Patented Mar. 15, 1966

3,240,248
LOCK NUT
William G. Waltermire, Cleveland, Ohio, assignor to The Lamson & Sessions Co., Cleveland, Ohio, a corporation of Ohio
Filed Jan. 21, 1963, Ser. No. 252,661
1 Claim. (Cl. 151—21)

The present invention relates to lock nuts and, more particularly, to a lock nut which has grooves therein providing beams which are deflected to render the nut slightly noncircular.

An important object of the present invention is to provide a novel and improved method of manufacturing a lock nut and a new and improved polygonal lock nut which has grooves defining a plurality of deflected locking beams and in which the upper or trailing portions of the threads are interrupted in such a manner that there is little or no loss of load carrying ability.

Another object of the present invention is to provide a new and improved polygonal lock nut or nut blank which is grooved along a portion of the thread length to provide beams that are deflected to produce the locking action of the nut and which is constructed and the deflection of the beams controlled in such a manner that the beams have little or no tendency to overdeflect or to present edges which act as cutters when the nut is applied to a bolt.

Another object of the present invention is to provide a new and improved polygonal lock nut having a plurality of grooves providing beams that are deflected and define a substantially continuous line.

A further object of the present invention is to provide a new and improved lock nut having grooves at the trailing or upper end of the nut which interrupt the threads and provide resilient locking beams that are deflected to cause the locking action with the nut being grooved in such a manner that the resiliency of the beams is improved to better suit the nut for use in applications requiring a large range of tolerances such as required by high temperature applications where parts are designed for an initial loose fit and/or for use in applications where oversized and erratic bolts are encountered.

A still further object of the present invention is to provide a new and improved lock nut having locking beams defined by grooves which interrupt the threads of the nut and wherein the outer surfaces of the nut have less distortion than other grooved nuts when the beams are deflected during manufacture.

Further objects and advantages of the present invention will be apparent from the following detailed description thereof made with reference to the accompanying drawings forming a part of the present specification, and in which.

In the preferred form of the present invention, a polygonal nut is grooved at one end to form beams which are deflected inwardly to provide a resilient locking action when the nut is threaded onto a threaded member. The grooves which define the beams open into the central opening through the nut and into an end face of the nut and lie in the across-corners planes of the nut. The grooves extend radially outwardly from the central opening to a maximum depth such that the wall thickness between each groove and the corner adjacent the groove is at least about as great as the wall thickness of the nut in the across-the-flats planes of the nut. The beams may be deflected so that the central opening is distorted, or as, in the preferred embodiment, ovalized, to provide the locking action, and the deflection of the beams defines a line which is substantially continuous in nature. Because of the limited radial depth of grooving, the beams are rather rigid and the individual beams are not particularly sensitive to being deflected inwardly to a point where the ends of the beams will act as cutters when the nut is applied to a threaded member, particularly when the beams are provided with rounded corners. The resultant lock nut is one which has considerably greater strength than the lock nuts heretofore formed by grooving the nut to provide beams and then deflecting the beams, and the problems of producing deflected beams which define a substantially continuous line and of controlling the deflection are minimized. Moreover, the nuts, because of increased resiliency of beams by reason of the described construction are more suitable for use through a wider range of applications from loose fit applications through applications where the bolts, such as coated bolts, are oversize.

Figure 1:
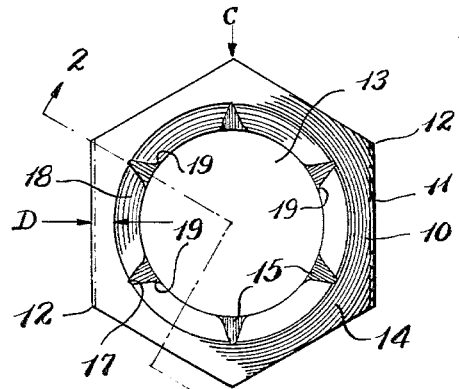
FIG. 1 is a top plan view of a lock nut embodying the present invention.
Figure 2:
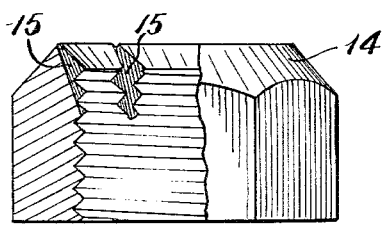
FIG. 2 is an elevational view of the nut shown in FIG. 1 with parts thereof cut away.

Referring to the drawings, a lock nut embodying the present invention is shown in FIG. 1 and, as illustrated therein, comprises a hexagonal nut 10 having flats 11 and corners 12. The nut 10 further comprises a threaded axial opening 13 extending therethrough.

The trailing end of the nut may be crowned, as indicated at 14, and the nut is provided with a plurality of grooves 15, preferably V-shaped as in the illustrated embodiment, which extend radially from the opening 13 toward the outer periphery of the nut and which open into the trailing end of the nut and the crown portion 14. The grooves 15 are disposed in the across-corners planes of the nut and the maximum depth of the grooves 15 in a radial direction is such that the distance C between the bottoms of the grooves, designated by the reference numeral 17, and the adjacent corners 12 is not less than about 90 percent of the thickness D of the wall of the nut in the across-flats plane of the nut. The grooves 15 have a maximum depth to the bottom of the V in a radial direction at the trailing end of the nut and the depth in the preferred design decreases proceeding axially from the trailing end of the nut to the lower end of the groove which is, in the preferred embodiment, approximately one-third the axial length of the nut. The bottoms of the grooves are rounded to increase fatigue strength.

The grooves 15 define locking beams 18 and at least certain of the beams are deflected to bend the beams inwardly and provide the locking action. Commonly, two of the beams opposite each other are deflected. In view of the fact that the depth of the grooves 15 is limited in the manner described, the beams 18, when deflected, tend to define a substantially continuous line so that the edges of the beams, designated by the reference numeral 19, do not project outwardly from the adjacent beam to present and act as a cutting edge when the nut is threaded onto a receiving member. The edge portions which define the edges 19, i.e., corners, of the beams at the intersections of the grooves with the axial opening through the nut are rounded as shown to minimize any tendency of the edges to act as a cutter.

Figure 3:
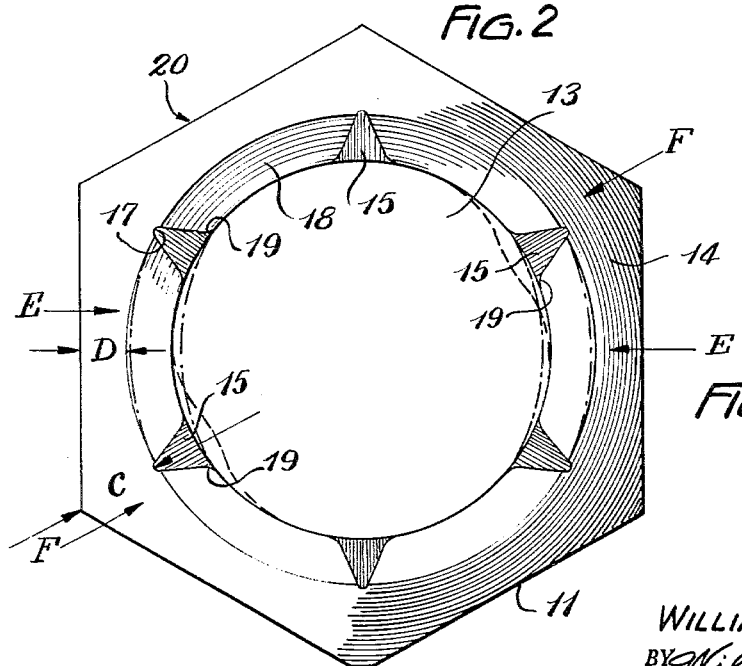
FIG. 3 is a top plan view of a nut before the beams are deflected, with the position of the beams after deflection being indicated in dot-dash lines.

FIG. 3 illustrates a nut which has been formed with a circular opening, grooved in the manner described, and then threaded. It will be noted that the rounding of the inner edges of the grooves along the wall of the axial opening and the grooves will minimize burrs during tapping as well as the detrimental effect of any burrs which are produced during the threading operation.

The nut of FIG. 3 is designated by the reference numeral 20 and to form a locking nut, certain of the beams 18 are to be deflected by applying deflecting forces to the beams. The direction of the deflecting forces is not critical and the forces may be applied by striking the nut crown 14 at one or more of the corners or flats with a force directed downwardly or in a sideways direction against the nut body or against the crown. The arrows E in FIG. 3 illustrate lines along which a sideways force may be applied. The beams may be deflected by conventional machinery for this purpose. After deflection, the beams may be positioned as indicated in dot-dash lines for deflecting forces applied to the flats of the nut. Because of the fact that the depth of the grooves 15 is limited in the manner described, the beams 18 are rather rigid beams and do not tend to overdeflect as is a problem with the nuts presently known to the trade. Moreover, the outer surfaces of the nut will be distorted less during manufacture and the deflected beams will have improved resiliency over a wider range. The beams on deflecting will define a line which is substantially continuous in nature. It is to be noted that since the wall thickness between the bottom of each groove 15 and the adjacent corner of the nut body is at least about as great as the wall thickness of the nut body in the across-the-planes or flats planes of the nut, the nut tends to act as a non-grooved nut with a uniform wall thickness when the deflecting forces are applied and tends to distort or ovalize along a continuous line. If deflecting forces are applied to the nut corners, the deflection may be generally as illustrated in broken dashed lines in FIG. 3.

In addition to the advantages heretofore pointed out, the strength of the nut is not materially affected by the grooving, since the groove does not affect the minimum wall thickness, and the load on individual threads of a nut decreases with distance from the nut base, while the thread interruption increases with distance from the nut base. Due to the better load distribution afforded by this design, the load carrying ability of the nut is increased. Preferably, the grooves 15 interrupt the threads for one-third to one-half the axial length of the nut.

It can now be seen that the present invention provides a new and improved lock nut of the grooved type which has greater load carrying ability and improved resiliency as compared to corresponding nuts of the prior art and deflected beams which define a substantially continuous line.

The number of beams which are deflected to provide the lock may be varied and it is not necessary that the deflecting forces be applied in the exact direction shown in the drawings or that the nut be crowned as illustrated.

The preferred embodiment of the present invention has been described in considerable detail and it is hereby my intention to cover all constructions, arrangements, and modifications which fall within the ability of those skilled in the art and within the spirit and scope of the present invention.

Having described my invention, I claim:

A lock nut comprising a nut body having a polygonal external configuration and a crown at one end of the nut body, said crown having a radial thickness which decreases proceeding from said nut body towards its end remote from said nut body, said nut body having an axial full depth threaded opening therethrough and said nut having a plurality of grooves lying in the across-corners planes of the nut body and opening into the axial threaded opening, said grooves extending axially of said nut from said remote end of said crown to a point within the nut body intermediate its ends and radially outwardly from said opening, said grooves having a maximum radial depth at said remote end of said crown and progressively decreasing in depth proceeding axially inwardly from said remote end of said crown to a minimum depth at their inner ends located intermediate the ends of the nut body, said grooves extending approximately one-third the axial length of said nut and defining therebetween a plurality of locking beams, at least certain ones of the beams being deflected inwardly to define an ovalized opening at one end of the nut and with the beams lying along a continuous line, the wall thickness of the nut body between the bottoms of said grooves and the adjacent corners thereof at its juncture with the crown being at least 90 percent of the minimum wall thickness of the nut body in the across-flat planes thereof, said locking beams having axially extending edges at their junction with said grooves which are arcuate and said grooves having bottoms which are arcuate when viewed in a plane transverse to the axis of the nut.

References Cited by the Examiner

UNITED STATES PATENTS

| | | |
|---|---|---|
| 1,516,716 | 11/1924 | Cole. |
| 1,639,681 | 8/1927 | Berlin. |
| 1,966,613 | 7/1934 | Cole. |
| 2,592,129 | 4/1952 | Engstrom. |
| 2,846,701 | 8/1958 | Bedford. |

FOREIGN PATENTS

| | | |
|---|---|---|
| 16,223 | 7/1910 | Great Britain. |
| 550,823 | 1/1943 | Great Britain. |

EDWARD C. ALLEN, *Primary Examiner.*